United States Patent

Takeda et al.

[11] Patent Number: 5,155,621
[45] Date of Patent: Oct. 13, 1992

[54] OPTICAL FIBER AMPLIFIER

[75] Inventors: Keiko Takeda, Yokohama; Shinya Inagaki; Kenji Tagawa, both of Tokyo; Osamu Oyama, Yokohama, all of Japan

[73] Assignee: Fujitsu Limited, Kawasaki, Japan

[21] Appl. No.: 736,932

[22] Filed: Jul. 29, 1991

[30] Foreign Application Priority Data

Jul. 31, 1990 [JP] Japan ................. 2-201440
Mar. 20, 1991 [JP] Japan ................. 3-057417

[51] Int. Cl.$^5$ .................. H01S 3/06; H04B 9/00; G02B 6/00
[52] U.S. Cl. ................. 359/337; 359/333; 359/339; 359/341
[58] Field of Search ........... 359/124, 333, 337, 339, 359/341

[56] References Cited

U.S. PATENT DOCUMENTS

| | | | |
|---|---|---|---|
| 3,615,312 | 10/1971 | Marino | 372/6 |
| 3,963,347 | 6/1976 | Segre et al. | 356/5 |
| 4,143,332 | 3/1979 | Michon et al. | 339/333 |
| 4,556,279 | 12/1985 | Shaw et al. | 350/96.15 |
| 4,708,421 | 11/1987 | Desurvire et al. | 350/96.15 |
| 4,852,117 | 7/1989 | Po | 372/97 |
| 4,938,556 | 7/1990 | Digonnet et al. | 372/6 |
| 4,945,531 | 7/1990 | Suzuki | 356/352 |
| 5,005,175 | 4/1991 | Desurvire et al. | 372/6 |
| 5,087,108 | 2/1992 | Grasso et al. | 385/27 |

FOREIGN PATENT DOCUMENTS 2926977 1/1981 Fed. Rep. of Germany .

Primary Examiner—Nelson Moskowitz
Attorney, Agent, or Firm—Staas & Halsey

[57] ABSTRACT

An optical fiber amplifier in which light generated within an Er doped optical fiber by spontaneous emission is eliminated or suppressed. By inserting a wavelength demultiplexer in the Er doped optical fiber, the light generated within the optical fiber by spontaneous emission can be effectively eliminated. As an alternative, the Er doped optical fiber is arranged in a coil form with a predetermined radius of curvature to thereby effectively eliminate light due to spontaneous emission on the longer wavelength side than the signal light. Further, by doping the center portion of the core of an optical fiber with aluminum and the whole body of the core uniformly with erbium, it is made possible to suppress the generation of light by spontaneous emission without causing an adverse effect on the amplification performance of the signal light.

1 Claim, 7 Drawing Sheets

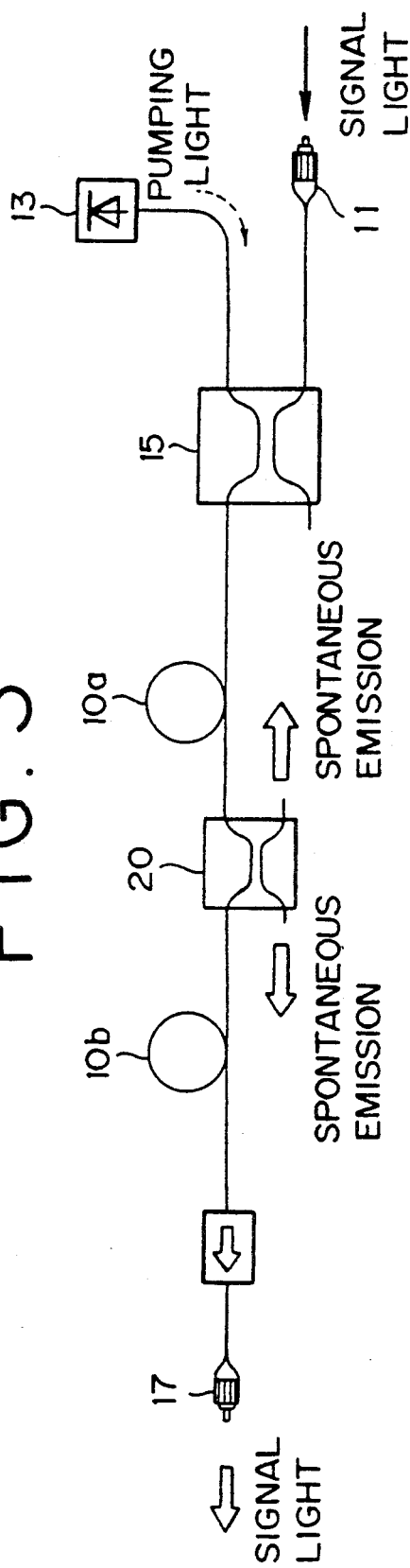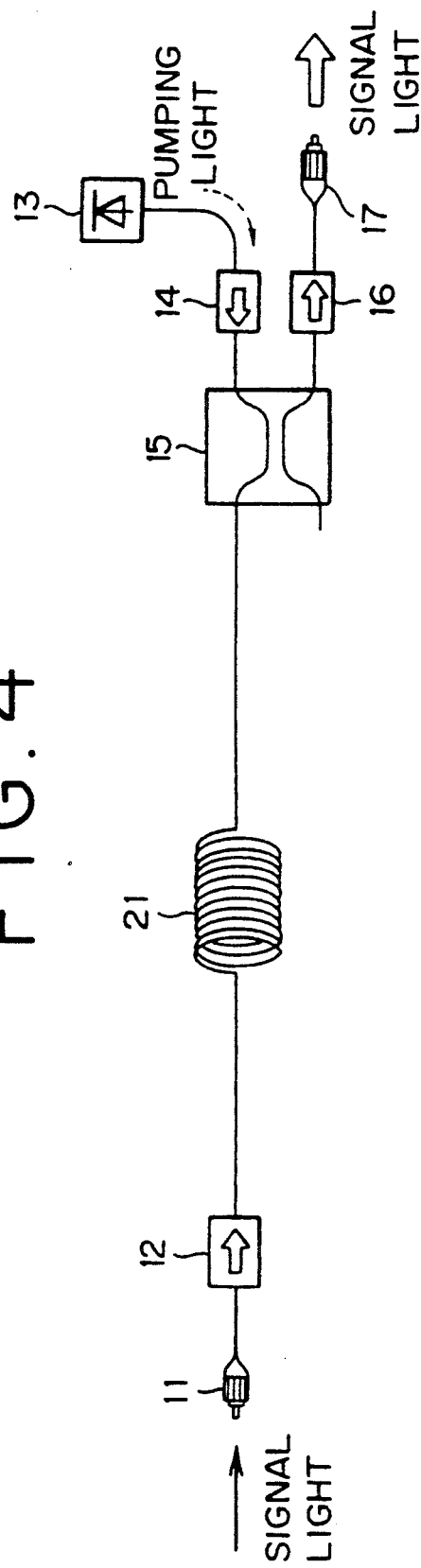

OPTICAL FIBER AMPLIFIER

FIELD OF THE INVENTION

The present invention relates to an optical fiber amplifier directly amplifying an optical signal, without converting the optical signal into an electrical signal.

BACKGROUND OF THE INVENTION

In an optical communication system practically used at present, a repeater is inserted at fixed distance intervals, so as to compensate the attenuation of an optical signal due to a loss in an optical fiber. The repeater is constructed in such a manner that the optical signal is converted into an electrical signal by a photodiode, followed by amplification of the electrical signal by means of an electronic amplifier, and thereafter the electrical signal thus amplified is converted into an optical signal by means of a semiconductor laser or the like, followed by returning of the optical signal to an optical transmission line. If the optical signal can be directly amplified with a low noise as it stands, the optical repeater can be made compact and economized.

In this circumstance, many researches in an optical amplifier capable of directly amplifying an optical signal have been greatly developed. The optical amplifier subjected to the researches is generally classified into (a) an optical fiber amplifier employing, in combination, an optical fiber doped with a rare earth element (Er, Nb, Yb, etc.) and a pumping light; (b) an optical amplifer employing a semiconductor laser doped with the rare earth element; and (c) an optical amplifier utilizing a nonlinear effect in the optical fiber.

Above all, the optical fiber amplifier employing the combination of the rare earth element doped fiber and the pumping light as mentioned in the above type (a) has excellent features such as no polarization dependency, low noise, and small coupling loss to a transmission line. Accordingly, the optical amplifier of this type is expected to remarkably increase a repeating distance in an optical fiber transmission system, and it is also expected to enable multiple distributions of the optical signal.

The principle of the optical amplification achieved by means of a rare earth doped fiber will be described below. If a pumping light beam is introduced into an optical fiber having its core doped with erbium, Er atoms are excited to a higher energy level. Then, if a signal light beam is allowed to impinge on the Er atoms in the optical fiber excited to the high level, the Er atoms undergo a transition to a lower energy level and stimulated emission of radiation occurs. Then, power of the signal light progressively increases as it propagates through the optical fiber and thus amplification of the signal light is achieved.

Optical fiber amplifiers operating on the above described principle are extensively developed. A conventional optical fiber amplifier is structured as described below. That is, a signal light beam is introduced into an Er doped optical fiber through an optical isolator, and at the same time, a pumping light beam emitted from a pumping light source is introduced therein through an optical isolator and a wavelength multiplexer/demultiplexer. By making light power of the pumping light sufficiently great, Er atoms within the Er doped optical fiber can be excited to a higher energy level, so that, by the introduced signal light, stimulated emission of light with the same wavelength takes place and an amplified signal light beam is emitted through the wavelength multiplexer/demultiplexer and an optical isolator to the transmission line.

The optical amplifying action performed by the Er doped optical fiber will be described with reference to the energy level diagram of FIG. 1. Er atoms are raised from the ground level ($^4I_{15/2}$) to the excited level by optical energy of the pumping light with the wavelength 0.98 $\mu$m or 1.48 $\mu$m and undergo transition within the excited level and fall to the level of 1.55 $\mu$m band ($^4I_{13/2}$). At this time, if a light beam of the wavelength 1.536 $\mu$m is introduced as the signal light, stimulated emission of the Er atoms staying at the 1.55 $\mu$m band level takes place as indicated by the arrow "A" and the signal light is thereby amplified.

At the same time, light due to spontaneous emission with wavelengths 1.53 to 1.57 $\mu$m is generated as indicated by the arrow "B" on account of expansion of the 1.55 $\mu$m band level. However, the light generated by spontaneous emission in the Er doped optical fiber is amplified within the Er doped optical fiber by the energy of the pumping light as with the signal light, and thereby, the amplification of the signal light is adversely affected and the S/N ratio of the signal light is deteriorated.

SUMMARY OF THE INVENTION

Accordingly, an object of the present invention is to provide an optical fiber amplifier which can perform proper amplification of the signal light by arranging it such that the light generated by spontaneous emission within its Er doped optical fiber is reduced and the adverse effect produced on the signal light by the light due to spontaneous emission is thereby suppressed.

In accordance with an aspect of the present invention, there is provided an optical fiber amplifier adapted such that signal light and pumping light are propagated through an optical fiber doped with erbium and the signal light is thereby amplified, wherein a wavelength demultiplexer for eliminating light generated within the optical fiber by spontaneous emission from the optical fiber is inserted in the optical fiber.

According to the above described arrangement, since the light due to spontaneous emission is eliminated from the erbium doped optical fiber by the wavelength demultiplexer, the signal light is properly amplified in the doped optical fiber.

In accordance with another aspect of the present invention, there is provided an optical fiber amplifier adapted such that signal light and pumping light are propagated through an optical fiber doped with erbium and the signal light is thereby amplified, wherein the optical fiber is arranged in a coil form with a radius of curvature causing a little bend loss on the signal light and a great bend loss on light due to spontaneous emission on the longer wavelength side than the signal light.

According to the above described arrangement, since the light due to spontaneous emission on the longer wavelength side is eliminated by the bend loss in the doped optical fiber, the signal light is properly amplified in the doped optical fiber.

In accordance with a further aspect of the present invention, there is provided an optical fiber suitable for use in an optical fiber amplifier for directly amplifying signal light comprising: a core of which the whole body is doped with erbium and only the center portion is additionally doped with aluminum; and a cladding surrounding the core, with a lower index of refraction than the core.

By the use of the optical fiber of the above described structure in the optical fiber amplifier, the fluorescence of the wavelength affecting the signal light is reduced by the doping with aluminum of the center portion of the core. Further, by the uniform doping with erbium of the whole body of the core, the erbium distribution below the threshold value of the pumping light is kept from contributing to the amplification, which leads to an increase in the absorption loss caused on the wavelength close to that of the signal light. Thus, it is made possible to reduce the light due to spontaneous emission with the wavelength adversely affecting the amplification of the signal light.

By doping not only the core but also a portion or the whole body of the cladding with erbium, not only the light due to spontaneous emission generated in the core can be reduced but also that generated in the cladding can be reduced.

The above and other objects, features, and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a schematic structural diagram of an optical fiber amplifier according to a second embodiment of the present invention;

FIG. 4 is a schematic structural diagram of an optical fiber amplifier according to a third embodiment of the present invention;

DESCRIPTION OF THE PREFERRED EMBODIMENTS

Figure 1:
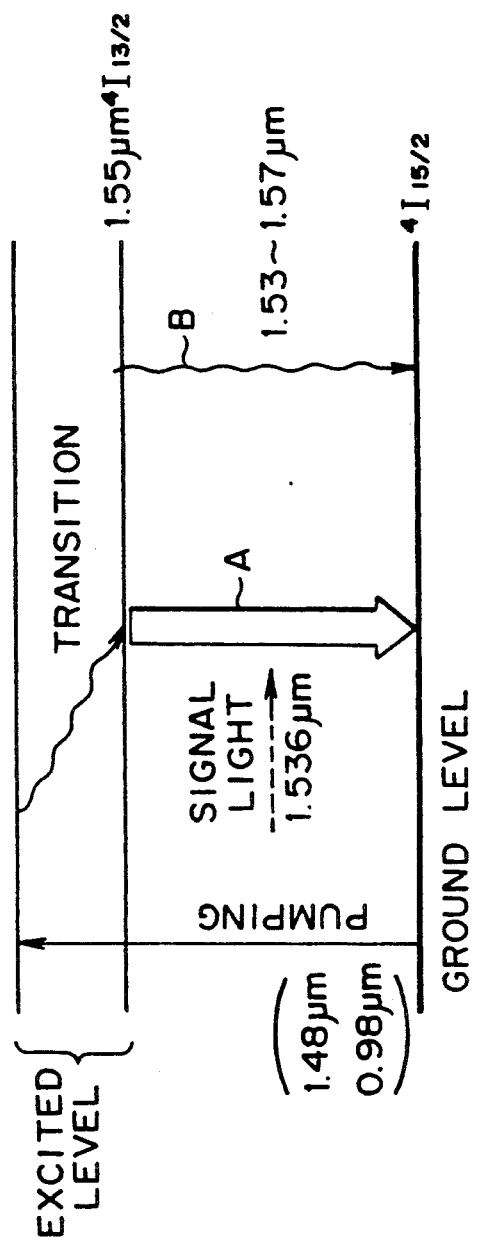
FIG. 1 is an energy level diagram for explaining the action in a prior art optical fiber amplifier.
Figure 2:
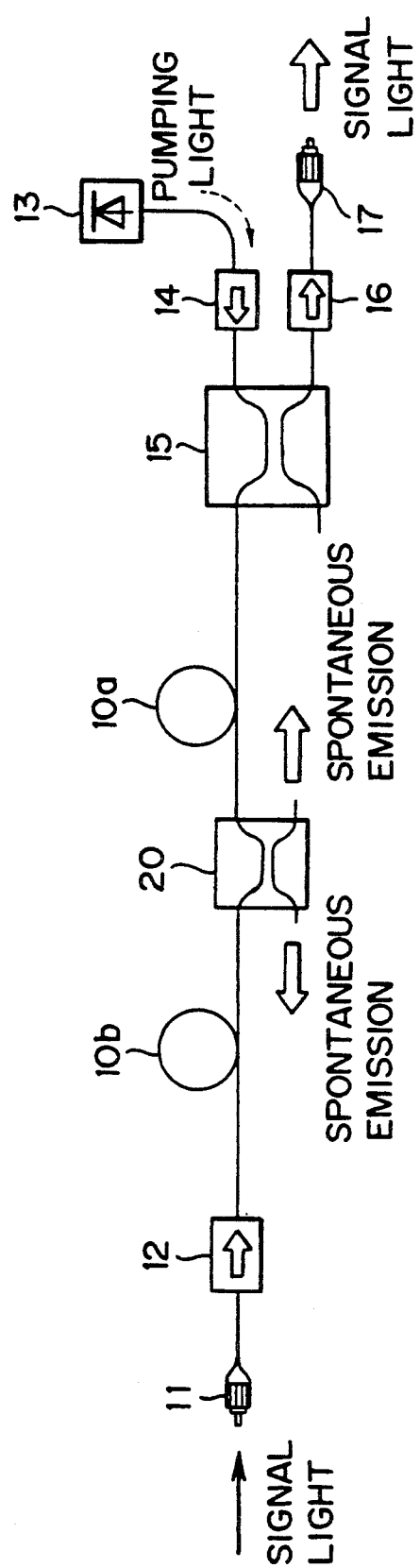
FIG. 2 is a schematic structural diagram of an optical fiber amplifier according to a first embodiment of the present invention.

An optical fiber amplifier according to a first embodiment of the present invention will now be described with reference to FIG. 2. The first embodiment is of a backward pumping arrangement in which the pumping light is introduced in the opposite direction to the propagating direction of the signal light. Reference numerals 10a and 10b denote optical fibers having their core doped with erbium (Er), between which is provided a wavelength demultiplexer 20. The wavelength demultiplexer 20 is provided for separating, from the doped optical fibers 10a and 10b, the light due to spontaneous emission on the side of longer wavelengths (light of the wavelength 1.55 $\mu$m or above) than the signal light having the wavelength 1.536 $\mu$m introduced from the signal light input end 11.

Pumping light with the wavelength 1.48 $\mu$m emitted from a pumping light source 13 propagates through an optical isolator 14 and a wavelength multiplexer/demultiplexer 15 and, further, through an Er doped optical fiber 10a and a wavelength demultiplexer 20, down to an Er doped optical fiber 10b. When the pumping light having sufficiently great light power is introduced into the Er doped optical fibers 10a and 10b, Er atoms within the optical fibers 10a and 10b are raised to a higher energy level.

Meanwhile, the signal light having the wavelength 1.536 $\mu$m introduced from the signal light input end 11 is led into the Er doped optical fiber 10b through an optical isolator 12, and therein, the signal light is amplified by stimulated emission. At this time, light due to spontaneous emission is also generated, but the light on the higher wavelength side than the signal light having the wavelength 1.55 $\mu$m and above is separated from the signal light and discharged by the wavelength demultiplexer 20. The signal light output from the wavelength demultiplexer 20 is led into the Er doped optical fiber 10a, where the signal light is amplified still more by stimulated emission to be output from the signal light output end 17 through the wavelength multiplexer/demultiplexer 15 and an optical isolator 16. The light generated by spontaneous emission within the Er doped optical fiber 10a is not allowed to enter the Er doped optical fiber 10b because the light on the higher wavelength side than the signal light, having the wavelength 1.55 $\mu$m and above, is separated from the signal light and discharged by the wavelength demultiplexer 20.

As described above, of the light generated by spontaneous emission in the Er doped optical fibers 10a and 10b, the light having the wavelength 1.55 $\mu$m and above is eliminated by the wavelength demultiplexer 20. Therefore, the amplifying performance of the signal light is kept from being adversely affected by the light due to spontaneous emission, and the S/N ratio of the amplified signal light can be improved. Further, since it becomes possible to allow the portion of the energy of the pumping light that has been used for amplification of the light due to spontaneous emission to contribute to the amplification of the signal light, an improvement in the amplification efficiency of the signal light can be achieved.

Although, in the present embodiment, only one wavelength demultiplexer 20 is inserted between the Er doped optical fibers 10a and 10b, a plurality of wavelength demultiplexers may be inserted into the Er doped optical fiber at intervals of a predetermined distance. By such arrangement, the light generated by spontaneous emission in the Er doped optical fiber can be separated from the signal light more effectively.

Now, an embodiment of a forward pumping arrangement in which the signal light and the pumping light are propagated in the same direction will be described with reference to FIG. 3.

According to this arrangement, the pumping light with the wavelength 1.48 μm emitted from the pumping light source 13 is propagated through the wavelength multiplexer/demultiplexer 15 and, then, through the Er doped optical fiber 10a and the wavelength demultiplexer 20 down to the Er doped optical fiber 10b. Meanwhile, the signal light with the wavelength 1.536 μm entering the signal light input end 11 is passed through the wavelength multiplexer/demultiplexer 15 to be introduced into the Er doped optical fiber 10a, where it is amplified by stimulated emission. At this time, light is also generated by spontaneous emission as described in the first embodiment. From the light thus generated by spontaneous emission, that having the wavelength 1.55 μm or above, i.e., on the longer wavelength side than the signal light, is eliminated by the wavelength demultiplexer 20 in the subsequent stage.

Accordingly, only the signal light is output from the wavelength demultiplexer 20 to be input to the Er doped optical fiber 10b. This signal light is further amplified by stimulated emission in the Er doped optical fiber 10b and emitted from the signal light output end 17 through the optical isolator 19. Of the light generated in the Er doped optical fiber 10b by spontaneous emission, that with the wavelength 1.55 μm or above is separated from the signal light by the wavelength demultiplexer 20 and, hence, it is not introduced into the Er doped optical fiber 10a. Therefore, also in this second embodiment, it is made possible to properly amplify the signal light.

Now, a third embodiment of a backward pumping arrangement according to the present invention will be described with reference to FIG. 4. In this embodiment, a coil-formed Er doped optical fiber 21 is used. The coil-formed Er doped optical fiber 21 is arranged in a coil form with its radius of curvature set such that the bend loss caused on the signal light with the wavelength 1.536 μm is small but the bend loss caused on the light generated by spontaneous emission in the Er doped optical fiber 21, with the wavelength on the higher wavelength side than the signal light generated in the Er doped optical fiber 21 (with the wavelength 1.55 μm or above), is great.

Figure 5:
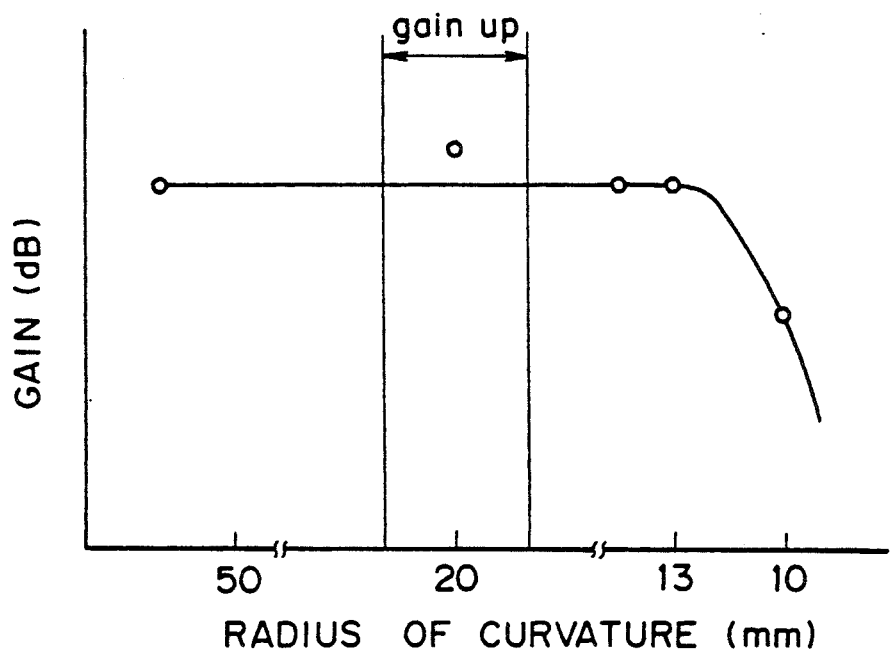
FIG. 5 is a schematic diagram showing a relationship between the gain in an Er doped optical fiber and the radius of curvature.

The preferable radius of curvature is approximately 20 mm. As understood from the relationship between the radius of curvature R and the gain in the Er doped optical fiber 21 shown in FIG. 5, the most reasonable gain of the Er doped optical fiber 21 eliminating the light due to spontaneous emission with the wavelength 1.55 μm or above and amplifying the signal light with the wavelength 1.536 μm is obtained when the radius of curvature R=20 mm±3 mm. As apparent from FIG. 5, the gain markedly decreases when the radius of curvature R=13 mm or below.

According to the arrangement of FIG. 4, the pumping light with the wavelength 1.48 μm emitted from the pumping light source 13 is propagated through the optical isolator 14 and the wavelength multiplexer/demultiplexer 15 down to the coil-formed Er doped optical fiber 21, and excites Er atoms within the optical fiber 21 to a higher energy level. Meanwhile, the signal light with the wavelength 1.536 μm input to the signal light input end 11 is introduced, through the optical isolator 12, into the coil-formed Er doped optical fiber 21, wherein the signal light is amplified by stimulated emission. The light generated by spontaneous emission at this time with the wavelength 1.55 μm or above is not allowed to propagate through the coil-formed optical fiber 21 but elimated because of the great bend loss of the coil-formed optical fiber 21. The signal light being amplified while propagating through the coil-formed Er doped optical fiber 21 is passed through the wavelength multiplexer/demultiplexer 15 and the optical isolator 16 to be emitted from the signal light output end 17.

According to the third embodiment, since the light due to spontaneous emission with the wavelength larger than 1.55 μm is eliminated and the signal light with the wavelength 1.536 μm is amplified by the coil-formed Er doped optical fiber 21, the signal light can be amplified without deteriorating its S/N ratio. The present embodiment is that which is applied to the backward pumping arrangement but it can be equally applied to the forward pumping arrangement shown in FIG. 3 in which the signal light and the pumping light propagate in the same direction.

Now, an optical fiber amplifier according to a fourth embodiment will be described below with reference to FIG. 6, FIG. 7, FIG. 10, and FIG. 11. The fourth embodiment is an optical fiber amplifier formed of an Er doped optical fiber 22 having a structure as shown in the sectional view of FIG. 6.

Figure 6:
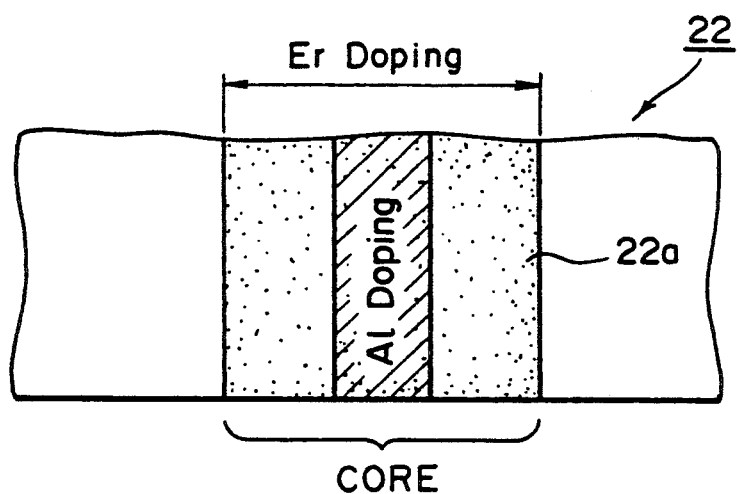
FIG. 6 is a fragmentary sectional view of an Er doped optical fiber suitable for use in an optical fiber amplifier according to a fourth embodiment of the present invention.

The Er doped optical fiber 22 shown in FIG. 6 is arranged such that the center portion of its core 22a is doped with aluminum, while the whole body of the core 22a is doped with erbium.

Figure 7:
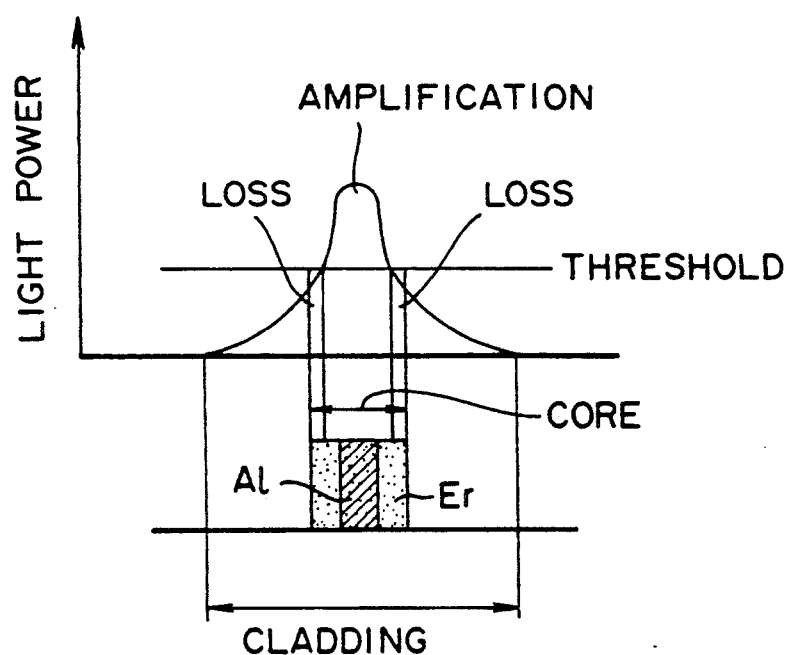
FIG. 7 is a schematic diagram for explaining the amplifying action performed in the doped optical fiber shown in FIG. 6.
Figure 10:
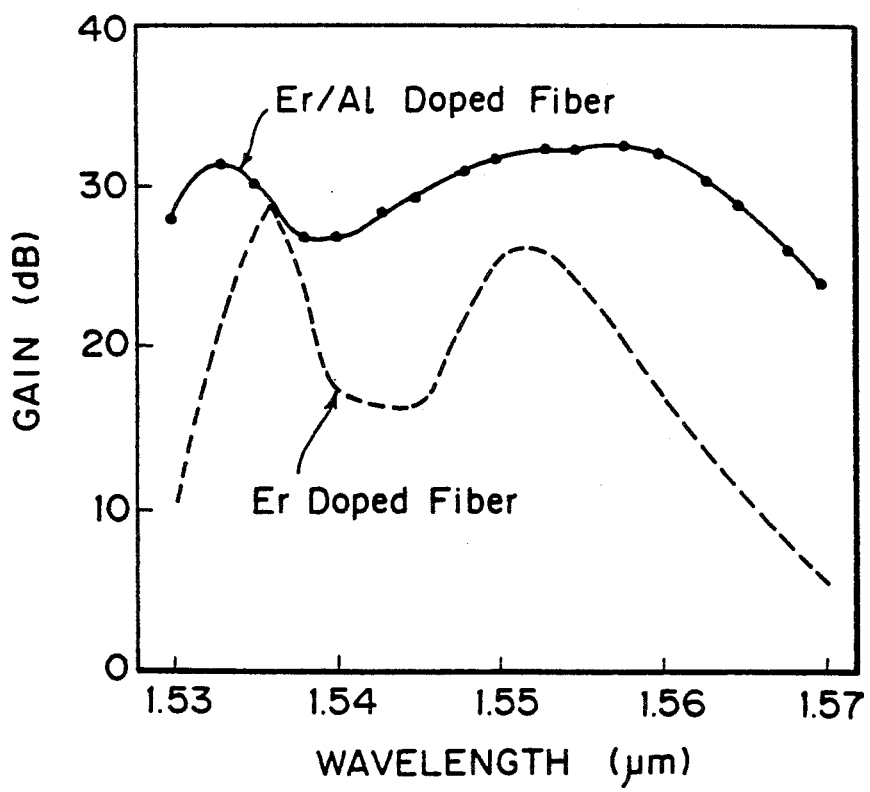
FIG. 10 is a graph showing fluorescent characteristics of an optical fiber whose core is doped only with erbium and an optical fiber whose core is doped with erbium/aluminum.
Figure 11:
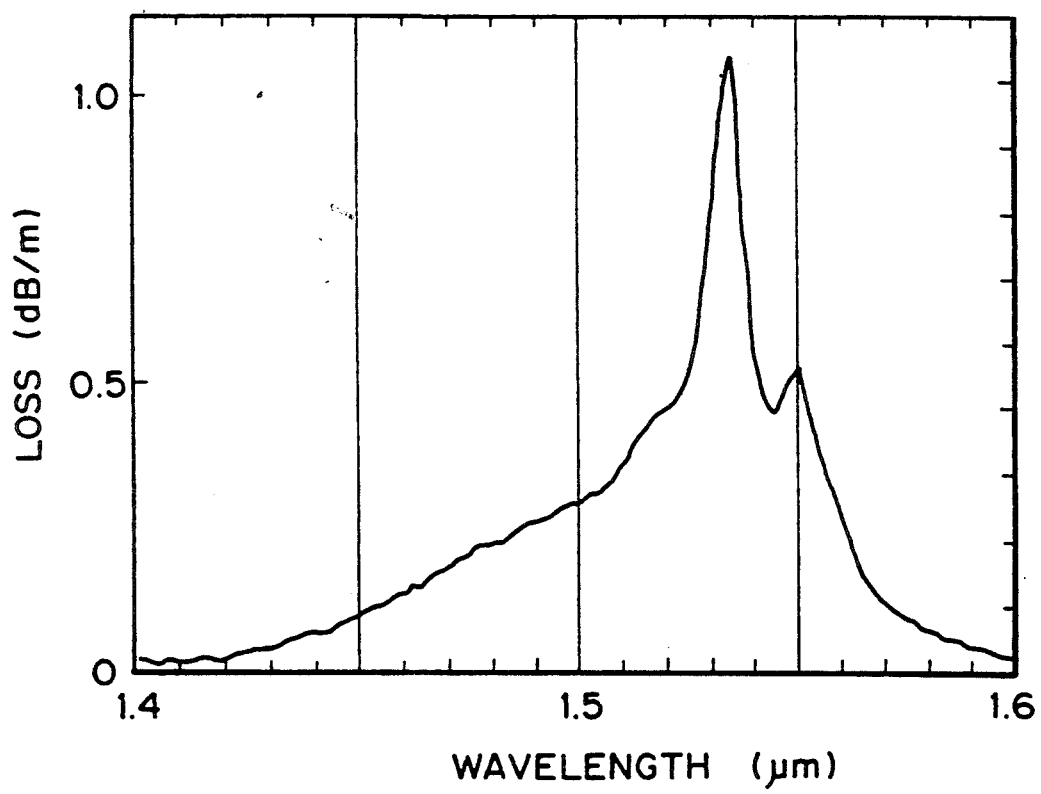
FIG. 11 is a graph showing an absorption loss characteristic of erbium.

The light power in the Er doped optical fiber 22 of the described structure is distributed as shown in FIG. 7. By the doping of the center portion of the core 22a with aluminum, the fluorescent characteristic of the doped optical fiber is shifted to a band around 1.55 μm as shown in FIG. 10 and, hence, the fluorescence in the vicinity of 1.536 μm is reduced. Accordingly, generation of the light by spontaneous emission around the 1.536 μm band can be reduced. Further, the doping with Er throughout the whole body of the core 22a leads to the result that the Er distribution within the core 22a below the threshold value of the pumping light does not contribute to the amplification. Accordingly, as shown in the absorption loss characteristic of erbium in FIG. 11, the absorption loss around the wavelength 1.536 μm is increased. Thereby, the light generated by spontaneous emission within the core 22a around the wavelength 1.536 μm can be reduced.

While the signal light with the wavelength 1.536 μm was used in the above described first to third embodiments, a signal light with the wavelength 1.55 μm is used in the present fourth embodiment because the light due to spontaneous emission around the wavelength 1.53 μm is eliminated.

By the use of the Er doped optical fiber 22 shown in FIG. 6, the generation of the light by spontaneous emission around the wavelength 1.53 μm can be reduced and, in addition, the energy of the pumping light that has been used for amplication of the light due to spontaneous emission can be utilized for the amplification of the signal light of the wavelength 1.55 μm, an improvement in the amplification efficiency of the signal light can be achieved.

Figure 8:
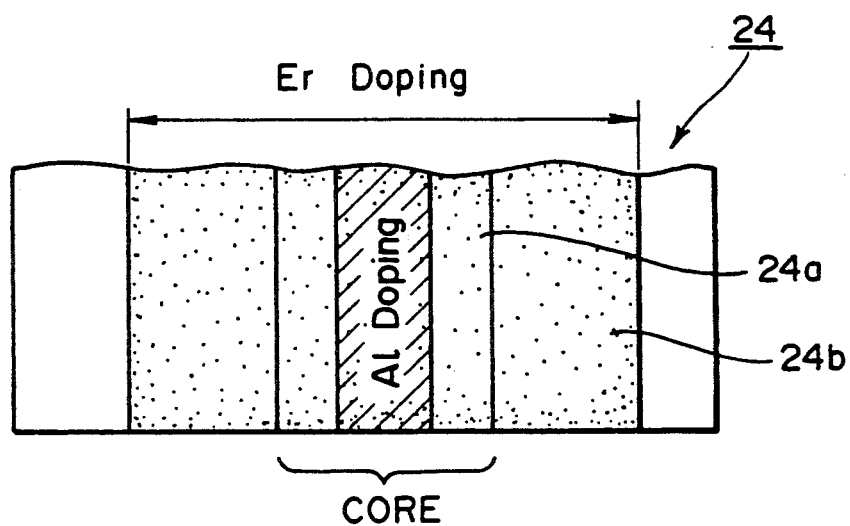
FIG. 8 is a fragmentary sectional view of an Er doped optical fiber suitable for use in an optical fiber amplifier according to a fifth embodiment of the present invention.

Referring now to FIG. 8, there is shown a sectional view of an optical fiber 24 suitable for use in an optical fiber amplifier according to a fifth embodiment of the present invention.

Figure 9:
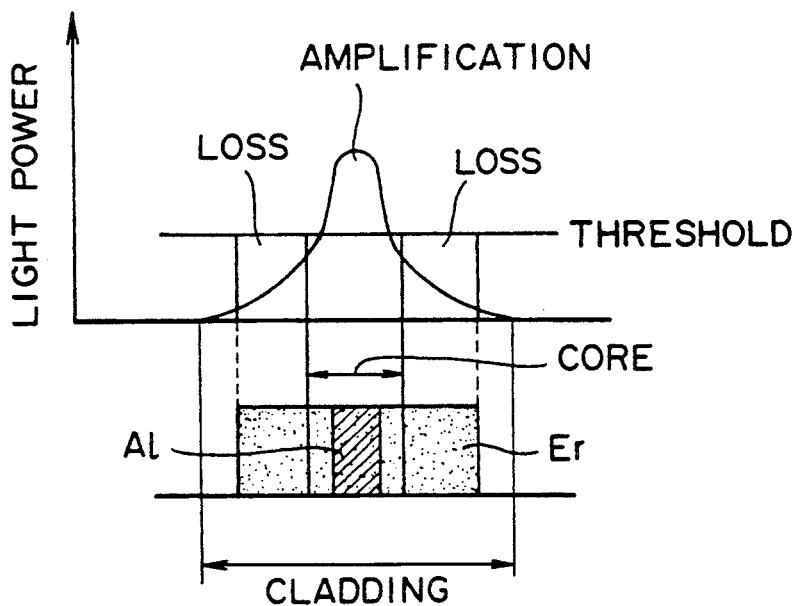
FIG. 9 is a schematic diagram for explaining the amplifying action performed in the doped optical fiber shown in FIG. 8.

The Er doped optical fiber 24 in the present embodiment is arranged such that the center portion of its core 24a is doped with aluminum, while the whole body of the core 24a and a portion of the cladding 24b are doped with erbium. As to the doping of the cladding 24b with erbium, it is preferred that the Er doping becomes less concentrated toward the circumference of the cladding 24b. That is, since the light power becomes lower toward the circumference of the optical fiber 24, a smaller quantity of Er doping is sufficient to suppress the generation of the light by spontaneous emission there. By doping not only the core but also a part of the cladding with erbium as described above, the erbium distribution below the threshold value of the pumping light contributing to amplification is increased as shown in FIG. 9, and hence the absorption loss caused on the wavelength around 1.53 μm band generated by spontaneous emission within the core 24a and cladding 24b can be reduced.

In the present embodiment, the light around the wavelength 1.53 μm band generated by spontaneous emission within the cladding can be reduced, and therefore, the S/N ratio of the amplified signal light can be improved over that in the fourth embodiment shown in FIG. 7. Of cause, the signal light of the wavelength 1.55 μm is used in this embodiment the same as in the fourth embodiment described as related with FIG. 7.

What is claimed is:

1. An optical fiber suitable for use in an optical fiber amplifier for directly amplifying signal light comprising:

a core of the optical fiber being doped with erbium and only an inner center portion of the core additionally doped with aluminum; and a cladding surrounding said core, with a lower index of refraction than said core, said cladding being doped with erbium toward the inner center portion of the core.

* * * * *

UNITED STATES PATENT AND TRADEMARK OFFICE
CERTIFICATE OF CORRECTION

PATENT NO. : 5,155,621

DATED : OCTOBER 13, 1992

INVENTOR(S) : KEIKO TAKEDA ET AL.

It is certified that error appears in the above-identified patent and that said Letters Patent is hereby corrected as shown below:

Title PAGE [56] References Cited
line 2, "Marino" should be --Landry et al.--.

Title PAGE [56] References Cited, Col. 2, after line 6,
insert the following:

--PATENT ABSTRACTS OF JAPAN, Vol. 14, No. 94 (P-101), February 21, 1990 & JP-A-1 302 205 (FUJIKURA LTD.).

EUROPEAN CONFERENCE ON OPTICAL COMMUNICATION, Vol. 13, Sept. 13, 1987, Helsinki, Fi; "Bend Loss Characteristics of Single Mode Fibers", P. Geittner et al., pps. 97-108.

IEEE PHOTONICS TECHNOLOGY LETTERS, Vol. 2, No. 1, January 1990, New York, U.S., "A Widely Tunable Erbium-Doped Fiber Laser Pumped at 532 nm", C.Y. Chen et al., pps. 18-20.

S. Shimada, "In-Line Fiber Amplifiers Enabled 2,200 km Optical Transmission", IEEE TRANSACTIONS ON PARALLEL AND DISTRIBUTED SYSTEMS, Vol. 1, No. 2, p. 75.

UNITED STATES PATENT AND TRADEMARK OFFICE
CERTIFICATE OF CORRECTION

PATENT NO. : 5,155,621

DATED : OCTOBER 13, 1992

INVENTOR(S) : KEIKO TAKEDA ET AL.

It is certified that error appears in the above-identified patent and that said Letters Patent is hereby corrected as shown below:

H. Masuda et al., "High Grain Two-Stage Amplification with Erbium-Doped Fibre Amplifier", ELECTRONICS LETTERS, Vol. 26, No. 10, May 1, 1990, pp. 661-662.--.

Signed and Sealed this

Twentieth Day of June, 1995

Attest:

BRUCE LEHMAN

*Attesting Officer*  *Commissioner of Patents and Trademarks*